United States Patent [19]

Silverstein

[11] Patent Number: 5,563,870
[45] Date of Patent: Oct. 8, 1996

[54] OPTICAL WRITE/READ HEAD WITH LASER POWER CONTROL

[75] Inventor: Barry D. Silverstein, Rochester, N.Y.

[73] Assignee: Eastman Kodak Company, Rochester, N.Y.

[21] Appl. No.: 388,316

[22] Filed: Feb. 14, 1995

[51] Int. Cl.$^6$ ..................................... G11B 7/00
[52] U.S. Cl. ..................... 369/112; 369/106; 369/110; 369/116
[58] Field of Search .................................. 369/112, 110, 369/116, 106, 120, 121, 100, 44.12, 44.37, 44.38

[56] References Cited

U.S. PATENT DOCUMENTS

| | | | |
|---|---|---|---|
| 2,821,114 | 1/1958 | Wiemer et al. | 88/65 |
| 4,905,214 | 2/1990 | Nagashima | 369/44 |
| 4,963,003 | 10/1990 | Hiiro | 350/403 |
| 5,048,030 | 9/1991 | Kanagawa | 372/68 |
| 5,099,470 | 3/1992 | Matsubayashi | 369/110 |
| 5,105,410 | 4/1992 | Hiroshi et al. | 369/44.37 |
| 5,136,152 | 8/1992 | Lee | 369/112 |
| 5,172,369 | 12/1992 | Chikuma et al. | 369/112 |
| 5,249,167 | 9/1993 | Seo | 369/44.14 |
| 5,317,557 | 5/1994 | Goto | 369/112 |
| 5,444,677 | 8/1995 | Hosokawa et al. | 369/112 |

FOREIGN PATENT DOCUMENTS

| | | |
|---|---|---|
| 57-71537 | 5/1982 | Japan . |
| 57-71536 | 5/1982 | Japan . |
| 109437 | 4/1992 | Japan . |

Primary Examiner—Loha Ben
Attorney, Agent, or Firm—Raymond L. Owens

[57] ABSTRACT

An optical write/read head is provided with apparatus for monitoring the output of a read/write laser so that the laser power may be appropriately adjusted to maintain a desired level. The apparatus features a partially reflective, partially transmissive surface in the optical path between the laser source and the recording medium for reflecting a small percentage (e.g., 4% 6%) of the laser output to a photodetector forming part of an electrooptical feedback loop for controlling the laser power. Preferably, the laser power-controlling photodetector is located adjacent the photodetector used to develop the recording signal, and the partially reflective, partially transmissive surface is tipped a few degrees from normal to the optical axis. Also preferred is that the partially reflective, partially transmissive surface constitutes the rear surface of a quarter-wave plate used to rotate the angle of polarization of the read/write beam to avoid optical feedback to the laser cavity.

5 Claims, 2 Drawing Sheets

OPTICAL WRITE/READ HEAD WITH LASER POWER CONTROL

BACKGROUND OF THE INVENTION

1. Field of the Invention

This invention relates to the field of optical recording and playback. More particularly, it relates to improvements in apparatus for controlling the output power of a laser diode used in an optical head for recording/playing back (writing/reading) information on optical recording media.

2. The Prior Art

Laser diodes are commonly used in optical write/read heads to record and playback encoded information on optical discs and the like. In FIG. 1, for example, a conventional write/read head is shown as comprising a laser diode LD which produces a beam B of plane-polarized radiation. During writing of information on an optical disc D, the beam intensity is modulated by a data signal with laser power controlled through a suitable power circuit PC. The output of the laser diode is collimated by a lens L1 which directs the collimated beam B' through the combination of a polarizing beam splitter PBS and quarter-wave plate QWP. The beam splitter comprises a polarizing filter F which is oriented to transmit radiation in the plane in which beam B' is polarized, and the quarter-wave plate operates to circularly polarize the plane-polarized beam incident thereon. The circularly polarized beam from the quarter-wave plate is brought to focus on the recording layer of the optical disc by condenser lens L2. Upon being reflected by the optical disc, the direction or "handedness" in which the incident beam is circularly polarized is reversed. Upon passing again through the quarter-wave plate, the circularly polarized reflected beam becomes plane-polarized, this time in the direction perpendicular to the plane of polarization of the laser beam B. The polarizing filter of the beam splitter now acts to reflect the beam reflected from the disc toward a photodetector PD, and a condensing lens L3 brings such beam to focus on the photodetector. Both the front and rear surfaces of the quarter-wave plate, as well as various other surfaces in the optical path, are commonly provided with an anti-reflection coating AR to minimize optical transmission losses and stray light reflections. The above combination of the quarter-wave plate and polarizing beam splitter is commonly used to isolate the laser cavity from light reflected by the disc, thereby stabilizing, to some extent, the laser output power.

Generally speaking, laser diodes are well suited for use in optical recording applications for reasons which include size, power, phase coherency and monochromaticity. A drawback of such devices, however, is that the output power, as reflected by the beam intensity, tends to fluctuate, particularly with temperature changes and optical feedback. Such power fluctuations can give rise to the formation of non-uniform pits in the recording process, as well as errors in the playback signal. As a result, it has been common practice to provide some form of optical feedback in order to automatically and continually stabilize the laser's output power. For example, it has been proposed to mount a photodetector within the laser diode housing or "can" for the purpose of monitoring the emitted light level. The photodetector output is then fed back to a control circuit which, in response to the signal, drives the laser in such a manner as to maintain its radiated output within certain limits. While this approach is theoretically useful for controlling laser power, it is disadvantageous from a variety of standpoints, including performance. Stray light in the can, as produced, for example, by multiple reflections of the write/read beam before it exits the can, or by other non-selected beams produced by the laser diode, can produce an error in the photodetector signal, thereby rendering such signal non-indicative of the power in the beam of interest.

Rather than monitoring the laser beam intensity before the beam emerges from the laser diode's housing, several schemes have been proposed for directing a small portion of the laser diodes' output beam to a photodetector located outside the laser diode's housing. One such scheme is disclosed in Japanese Published Application No. 4-109437, published on Apr. 10, 1992. As shown in FIG. 2 wherein like reference characters denote like parts in the FIG. 1 apparatus, a laser beam B emitted by a laser diode is collimated and passed through a diffraction grating G to produce three discrete and closely spaced parallel beams (shown as one). The central beam of the three beams is used to write or read information on a magneto-optical disc D', and the outboard beams are used for tracking purposes. The three beams are directed through a non-polarizing beam splitter BS comprising a dielectric film F' which is arranged at 45 degrees relative to the optical path and adapted to transmits the major portion of the three beams to the recording disc. Upon being reflected by the disc, the three beams are reflected by the dielectric film F' towards a photodetector array PD1 which is used to derive focus, tracking and recorded signal information. The dielectric film in the beam splitter also functions to reflect a minority portion of each beam to a lateral surface S of the beam splitter, such surface being inclined at a small angle $\alpha$ from normal to the direction of the incident beam path. Preferably, surface S has no anti-reflection coating, whereby about 5% of the incident light is reflected towards a second photodetector array PD2 which is laterally displaced from photodetector PD1 and functions to sense the laser beam power and provide a feedback control signal to a laser control circuit CC which controls the laser power. Presumably, the non-reflected portion of the beam striking surface S is transmitted, absorbed or otherwise lost.

While laser power-monitoring systems of the above type may prove useful in maintaining the output of a laser diode relatively constant, they do so at the expense of a relatively costly optical element, namely, the beam splitter BS which is relatively unusual both in terms of shape and function. It would be highly desirable to be able to monitor laser power without the cost of any additional optical elements other than those required for writing and reading information on the recording media.

SUMMARY OF THE INVENTION

In view of the foregoing discussion, an object of this invention is to provide a means for monitoring laser power in an optical write/read head without using either additional optical elements or optical elements that need be specially designed to accomplish the power-monitoring function.

In accordance with a preferred embodiment of the invention, an optical write/read head comprises:

(a) a laser for producing a beam of radiant energy;

(b) a beam-splitter positioned in an optical path between the laser and a recording medium for transmitting at least a portion of the beam to the recording medium and for deflecting at least a portion of the beam reflected from the recording medium relative to the transmitted portion;

(c) a first photodetector positioned in the deflected portion of the beam;

(d) an optical element positioned in the optical path between the beam splitter and recording medium, such optical element having a partially reflective, partially transmissive surface inclined at a non-perpendicular angle relative to such optical path, such optical element being adapted to reflect a portion of the beam towards a predetermined position spaced from the first photodetector;

(e) a second photodetector located at the predetermined position for sensing the intensity of the reflected portion of the beam and for producing an output signal related thereto; and (f) control means operatively connected to the second photodetector and responsive to the output signal for controlling the intensity of the laser beam.

Preferably, the beam splitter is of the polarizing type, and the partially reflective, partially transmissive optical element comprises a quarter-wave plate which bears an anti-reflective coating only on its front surface, such quarter-wave plate being inclined at a non-perpendicular angle relative to the optical path between the beam splitter and the recording medium.

The invention and its various advantages will be better understood from the ensuing detailed description of a preferred embodiment, reference being made to the accompanying drawings wherein like reference characters denote like parts.

DETAILED DESCRIPTION OF PREFERRED EMBODIMENTS

Figure 3:
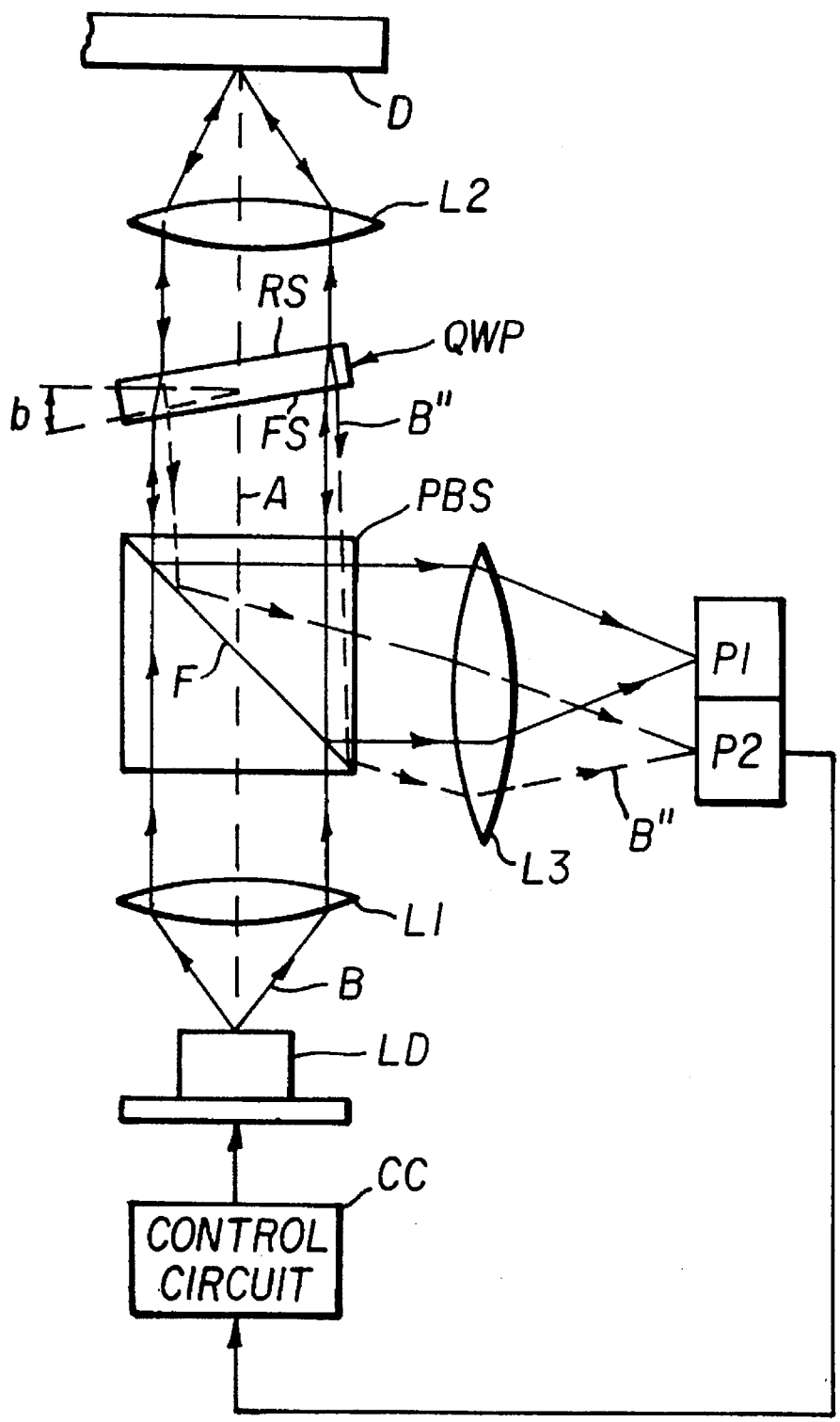
FIG. 3 is a schematic illustration of a preferred embodiment of the invention.

Referring now to FIG. 3, an optical write/read head structured in accordance with a preferred embodiment of the invention comprises a laser diode LD which produces a beam B of plane-polarized radiation. Beam B is collimated by lens L1 and passes through the combination of a polarizing beam splitter PBS and quarter-wave plate QWP which, as explained above, serves to isolate the laser cavity from optical feedback from the recording medium. Upon emerging from the quarter-wave plate, the beam is brought to focus on the recording medium, e.g., an optical disc D. Upon being reflected from the disc, the laser beam is deflected by the polarizing beam splitter, at an angle of 90 degrees, toward a photodetector P1. Lens L3 focuses the beam returning from the disc onto the photodetector.

Figure 1:
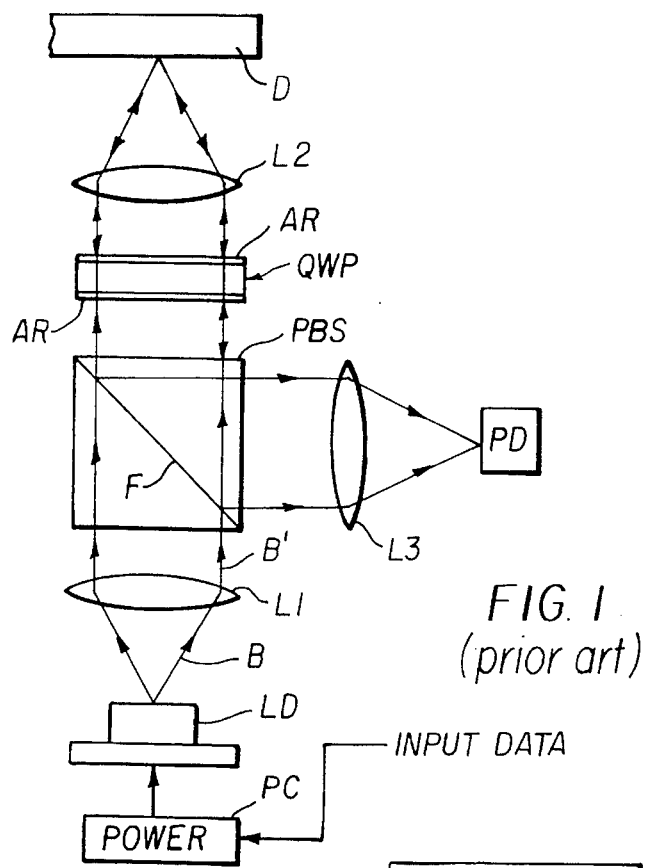
FIGS. 1 and 2 are schematic illustrations of optical write/read heads of the prior art.
Figure 2:
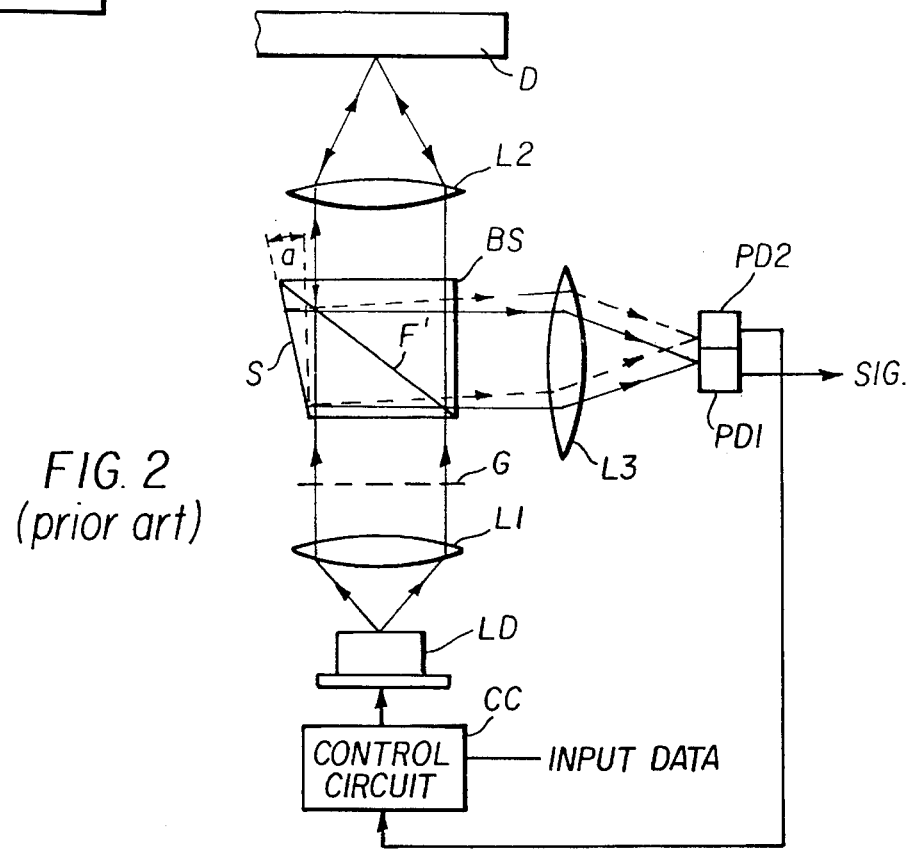

Now in accordance with the present invention, the quarter-wave plate is tilted by a small angle b relative to the normal to the optical axis A. Thus, the rear surfaces of the quarter wave plate is at a non-perpendicular obtuse angle relative to the optical path. As noted above with regard to the discussion of the prior art FIG. 1 apparatus, the quarter-wave plate is normally provided with anti-reflection coatings on both planar surfaces to reduce optical transmission and stray light losses. In FIG. 3, there are no reflective coatings. If such a coating were applied, only about 0.3% of the radiation incident on the coated surfaces of the quarter-wave plate is reflected, the remainder being transmitted. Thus, a relatively faint beam B" is reflected from the quarter-wave plate's rear surface RS and returns off-axis relative to optical axis A. Therefore, it is desirable not to use such coatings as disclosed below. Owing to the correctness of its polarization (having passed twice through the quarter-wave plate and being reflected), beam B" is deflected by the polarizing beam splitter, without any substantial light loss, toward a second photodetector P2, laterally spaced from photodetector P1. Lens L3 serves to focus beam B" on the second photodetector which operates, in a conventional manner to produce an output signal proportional to the beam intensity. This signal is fed back to the laser control circuit CC to stabilize the laser beam intensity.

In the optical system described above, it is important to note that beam B" undergoes the same polarization changes as that experienced by the beam used to write and read information on the recording medium. By using the rear surface to reflect light for power-monitoring purposes, virtually none of the power monitoring beam B" is fed back to the laser cavity., and virtually all of it is available for power monitoring. Note, too, that light reflected by the front surface FS of the quarter-wave plate is blocked by the polarization beam splitter and prevented from reaching the second photodetector. Further, due to the tilt of surface FS, the radiation reflected thereby is prevented from feeding back into the laser cavity. In order to increase the reflectivity of the quarter-wave plate's rear surface RS, it is highly preferred that the usual anti-reflection coating thereon is dispensed with. As a result, the surface reflectivity increases to about 5%. With conventional laser diodes, a 5% reflectivity provides ample signal strength to accurately indicate the instantaneous laser power and to control it.

From the foregoing description, it will be appreciated that a very simplistic apparatus has been devised for monitoring the laser power in a conventional optical write/read head. The apparatus relies on existing and conventional optical head components (e.g. a standard 45-90-45 degree beam-splitting prism, as opposed to a specially designed beam splitter as described in the aforementioned Japanese reference) and adds only an extra photosensitive element, on the photodetector array used to detect data, focus and tracking, for detecting the radiation reflected by the quarter-wave plate. Thus, the power-monitoring and control feature adds very little cost to the head.

While the invention has been disclosed with reference to a particularly preferred embodiment, it will be appreciated that modifications can be made without departing from the spirit of the invention, For example, the respective positions of the photodetector package and laser diode could be interchanged so that the output of the laser is deflected by 90 degrees prior to striking the disc, and so that the reflected radiation from the disc is transmitted directly to the photodetectors without deflection. Also, rather than using a surface of an existing optical element in the head to reflect a portion of the beam to a photodetector, an additional partially reflective, partially transmissive flat plate could be added to the optical path. Such a plate may be desirable, for example, in a magneto-optic head in which a quarter-wave plate can not be used. All such modifications and variations are intended to fall within the scope of the appended claims.

I claim:

1. An optical write/read head for writing and reading information on a recording medium, said optical write/read head comprising:

(a) a laser for producing a beam of radiant energy;

(b) a beam-splitter positioned between said laser and a recording medium for transmitting at least a portion of said beam to the recording medium and for deflecting at least a portion of the beam reflected from the recording medium relative to the transmitted portion;

(c) a first photodetector positioned in optical path of the deflected portion;

(d) a partially reflective, partially transmissive optical element positioned between said beam splitter and recording medium, said optical element having a partially reflective, partially transmissive surface inclined at an obtuse angle relative to an optical path between said beam splitter and said recording medium, said element being adapted to reflect a portion of said beam towards a predetermined position spaced from said first photodetector; and (e) a second photodetector located at said predetermined position for sensing the intensity of said reflected portion of said beam and for producing an output signal related thereto; and (f) control means operatively connected to said second photodetector and responsive to said output signal for controlling the intensity of said laser beam.

2. The apparatus as defined by claim 1 wherein said partially reflective, partially transmissive optical element comprises a quarter-wave plate.

3. An optical write/read head for writing and reading information on a recording medium, said optical write/read head comprising:

(a) a laser for producing a beam of radiant energy;

(b) means for directing said laser beam along an optical path towards said recording medium;

(c) a first photodetector positioned to detect said beam upon being reflected by said recording medium;

(d) a partially reflective, partially transmissive surface positioned between said laser and said recording medium, said surface being inclined at an obtuse angle relative to said optical path so as to reflect a portion of said beam towards a predetermined position spaced from said first photodetector; and (e) a second photodetector located at said predetermined position for sensing the intensity of said reflected portion of said beam and for producing an output signal related thereto; and (f) control means operatively connected to said second photodetector and responsive to said output signal for controlling the intensity of said laser beam.

4. The apparatus as defined by claim 3 wherein said partially reflective, partially transmissive surface comprises a quarter-wave plate having a pair of plane parallel surfaces.

5. The apparatus as defined by claim 4 wherein only one of said plane parallel surfaces bears an anti-reflection coating, said one surface being the first surface encountered by a beam propagated towards the recording medium by the laser.

* * * * *